US012677759B2

(12) United States Patent
Bagherli et al.

(10) Patent No.: US 12,677,759 B2
(45) Date of Patent: Jul. 14, 2026

(54) MODULAR PLANT GROWING SYSTEMS

(71) Applicant: Sproutation Inc., Winnipeg (CA)

(72) Inventors: Hamidreza Bagherli, Winnipeg (CA); Mohammad Asefi, Grande Pointe (CA)

(73) Assignee: Sproutation Inc., Winnipeg (CA)

( * ) Notice: Subject to any disclaimer, the term of this patent is extended or adjusted under 35 U.S.C. 154(b) by 0 days.

(21) Appl. No.: 19/296,344

(22) Filed: Aug. 11, 2025

(65) Prior Publication Data

US 2026/0047531 A1 Feb. 19, 2026

Related U.S. Application Data

(60) Provisional application No. 63/684,615, filed on Aug. 19, 2024.

(51) Int. Cl.
| | |
|---|---|
| *A01G 9/02* | (2018.01) |
| *A01G 7/04* | (2006.01) |
| *A01G 9/24* | (2006.01) |
| *A01G 9/26* | (2006.01) |

(52) U.S. Cl.
CPC ........... *A01G 9/0302* (2025.01); *A01G 7/045* (2013.01); *A01G 9/247* (2013.01); *A01G 9/26* (2013.01)

(58) Field of Classification Search
CPC ........ A01G 9/0302; A01G 9/247; A01G 9/26; A01G 7/045
See application file for complete search history.

(56) References Cited

U.S. PATENT DOCUMENTS

| | | | | |
|---|---|---|---|---|
| 5,511,342 | A * | 4/1996 | Maso ..................... | A01G 9/023 47/86 |
| 11,013,188 | B2 * | 5/2021 | Oliver .................. | A01G 9/0295 |
| 11,051,468 | B2 | 7/2021 | Kariv et al. | |
| 11,382,287 | B2 * | 7/2022 | Allen ................... | A01G 27/003 |
| 11,516,977 | B1 * | 12/2022 | Almadani .............. | A01G 31/02 |

(Continued)

FOREIGN PATENT DOCUMENTS

| | | |
|---|---|---|
| CN | 107231966 A | 10/2017 |
| GB | 2475864 A | 6/2011 |

(Continued)

OTHER PUBLICATIONS

International Search Report & Written Opinion dated Oct. 31, 2025 in PCT/CA2025/051052.

*Primary Examiner* — Monica L Perry
*Assistant Examiner* — Aaron M Rodziwicz

(57) ABSTRACT

A modular plant growing system includes (a) a pot module having (i) a pot body with a pot body base and at least one cavity for receiving a plant growing medium, (ii) a control system, and (iii) a pot module interface on the pot body base in electrical communication with the control system. The plant growing system further includes (b) a modular expansion platform including (i) a platform body having a platform top, (ii) grow equipment in the platform body, and (iii) a platform interface on the platform top in electrical communication with the grow equipment. The platform and pot module interfaces are interlockable to detachably stack the pot module atop the modular expansion platform to connect the grow equipment to the control system for expanding plant growing functionality of the plant growing system.

25 Claims, 12 Drawing Sheets

(56) References Cited

U.S. PATENT DOCUMENTS

| | | | | |
|---|---|---|---|---|
| 2013/0205662 A1 * | 8/2013 | Yancey | ............... | A01G 27/003 |
| | | | | 47/65.5 |
| 2016/0316637 A1 * | 11/2016 | Leone | ...................... | A01G 9/02 |
| 2019/0110416 A1 * | 4/2019 | Crain | ...................... | A01G 9/024 |
| 2021/0289724 A1 | 9/2021 | Chavez | | |
| 2022/0095558 A1 * | 3/2022 | Allen | ...................... | A01G 27/02 |
| 2025/0366410 A1 * | 12/2025 | Aggarwal | ............ | A01G 9/0302 |

FOREIGN PATENT DOCUMENTS

| | | | | | | |
|---|---|---|---|---|---|---|
| KR | 20140137654 A | * | 12/2014 | ............ | A01G 9/028 |
| KR | 20220064001 A | * | 5/2022 | .......... | A01G 9/0302 |
| KR | 20230063505 A | * | 5/2023 | .......... | A01G 27/008 |
| KR | 20240000529 U | * | 3/2024 | .......... | A01G 9/0302 |
| KR | 20250015697 A | * | 2/2025 | .......... | A01G 9/0302 |
| WO | 2009125023 A1 | | 10/2009 | | |
| WO | WO-2025120249 A1 | * | 6/2025 | ............ | A01G 9/023 |

* cited by examiner

100

106

145,
146

145,
148

180

102

104

MODULAR PLANT GROWING SYSTEMS

CROSS-REFERENCE TO RELATED APPLICATIONS

This application claims the benefit of U.S. Provisional Ser. No. 63/684,615 filed Aug. 19, 2024, which is hereby incorporated herein by reference in its entirety.

FIELD

The teachings disclosed herein relate generally to plant growth, and more specifically, to modular plant growing systems.

INTRODUCTION

International Pub. No. WO 2009/125023 A1 (Quist et al.) discloses a system for controlling the growth of at least one plant in a growth medium by determining the moisture content and the aqueous concentration of at least one plant nutrient and by regulating said parameters.

U.S. Pat. App. Pub. No. US 2013/0205662 A1 (Yancey et al.) discloses an automatic plant watering apparatus. The apparatus includes a container configured to hold soil elements sufficient to support a plant, a base module configured to secure and support the container, a pump configured to move fluid from a reservoir of the base module to the container when selectively controlled, and a control system configured to selectively control the pump based upon user inputs and monitored time. The control system is configured to receive user inputs associated with time periods for water pumping to the container. The container and base module are connected whereat a drain hole is coupled to a piping structure of the base module.

United States Pat. App. Pub. No. US 2021/0289724 A1 (Chavez) discloses a smart garden station for remotely managing growth and health of indoor plants. The smart garden station comprises a first container mounted on a panel and a second container inserted into the first container onto which a growing medium is disposed for planting seeds/plants. A set of sensors constantly monitor and communicate environment related data around the garden station to a remote electronic device. The remote electronic device generates a set of instructions to provide ideal environmental conditions at the garden station based on the received data. A processing unit receives these instructions and manages environmental conditions around the garden station. The processing unit controls the environment by primarily controlling the watering unit, the lighting unit, and the ventilation unit. These components modulate water content in growing medium and the temperature/humidity around the garden station to provide an optimal environment for the growth and health of the plants.

SUMMARY

The following summary is intended to introduce the reader to various aspects of the applicant's teaching, but not to define any invention.

According to some aspects, a modular plant growing system comprises (a) a pot module including: (i) a pot body having a pot body base for supporting the pot body upright, a pot body top vertically opposite the pot body base, and at least one cavity open to the pot body top for receiving a plant growing medium, (ii) a control system including at least one processor in the pot body for controlling operation of the plant growing system, and (iii) a pot module interface on the pot body base and including one or more pot module electrical connectors in electrical communication with the control system. The plant growing system further includes (b) a modular expansion platform including (i) a platform body having a platform base for supporting the platform body upright and a platform top vertically opposite the platform base, (ii) grow equipment in the platform body, and (iii) a platform interface on the platform top and including one or more platform electrical connectors in electrical communication with the grow equipment, the platform interface interlockable with the pot module interface to detachably stack the pot module atop the modular expansion platform with the one or more pot module electrical connectors coupled to the one or more platform electrical connectors to connect the grow equipment to the control system for expanding plant growing functionality of the plant growing system.

In some examples, the control system includes a sensor system integrated into the pot body and in communication with the at least one processor for measuring one or more plant growth parameters, and the control system is operable to control operation of the grow equipment based on the plant growth parameters measured by the sensor system.

In some examples, the modular expansion platform includes a plurality of expansion modules detachably stacked atop each other. At least two of the expansion modules comprise a different type of grow equipment relative to each other.

In some examples, each expansion module is configured for selective addition to and removal from the modular expansion platform independent of other expansion modules.

In some examples, at least two of the expansion modules are in electrical communication with each other and the pot module when detachably stacked.

In some examples, at least two of the expansion modules are in fluid communication with each other and the pot module when detachably stacked.

In some examples, the grow equipment comprises a fluid pump system operable by the control system for pumping fluid to the at least one cavity of the pot body, and the pot module interface and the platform interface have respective fluid connectors coupled to each other for providing fluid communication between the pot module and the fluid pump system when the pot module is detachably stacked atop the modular expansion platform.

In some examples, the fluid pump system includes a fluid pump and a fluid reservoir in fluid communication with the fluid pump for supplying fluid thereto.

In some examples, the fluid pump is provided in a pump expansion module and at least a portion of the fluid reservoir is provided in a reservoir expansion module detachably stacked between the pump expansion module and the pot module.

In some examples, the system further comprises a sprinkler system integrated into the pot body and including one or more sprinkler nozzles positioned about a periphery of the at least one cavity for dispersion of fluid to the plant growing medium, and wherein the fluid connectors include respective outflow connectors for conducting fluid from the fluid pump system to the sprinkler system.

In some examples, the pot module includes a pot body fluid reservoir internal the pot body, and wherein the fluid connectors include respective inflow connectors for supplying fluid from the pot body fluid reservoir to the fluid pump system.

In some examples, the pot body has an inner wall defining the at least one cavity and an outer wall spaced outwardly from the inner wall and defining an exterior of the pot body, and wherein the pot body fluid reservoir is between the inner and outer walls.

In some examples, the pot module interface has one or more pot body drainage ports in fluid communication with the at least one cavity for drainage therefrom, and the platform interface has one or more platform drainage ports for providing fluid communication between the one or more pot body drainage ports and an expansion platform fluid passage extending vertically through the platform body to one or more drainage outlets in the platform base.

In some examples, the grow equipment comprises a nutrient delivery system operable by the control system for delivering nutrients to the plant growing medium.

In some examples, the grow equipment comprises a grow light system operable by the control system for providing lighting to plants growing in the plant growing medium.

In some examples, the grow equipment comprises a rotation motor operable by the control system for driving rotation of the pot body about a vertical axis relative to a light source.

In some examples, the grow equipment comprises a battery pack for storing electrical energy for powering the plant growing system.

In some examples, the grow equipment comprises a wireless communication system for enabling wireless communication with the plant growing system.

In some examples, the grow equipment comprises a smart speaker system including a microphone for receiving verbal input to control operation of the plant growing system and a speaker for providing verbal output of information relating to the plant growing system.

In some examples, the grow equipment comprises an ultrasonic misting system including an ultrasonic transducer operable by the control system to generate water-based aerosol for delivery to one or more of the plant growing medium and at least one plant in the cavity.

According to some aspects, a pot module for a modular plant growing system includes (a) a pot body having a base, a top vertically opposite the base, and at least one cavity open to the top for receiving a plant growing medium, (b) a control system including at least one processor in the pot body for controlling operation of the plant growing system, and (c) a pot module interface on the base for detachably stacking the pot module atop a modular expansion platform comprising grow equipment. The pot module interface includes one or more pot module electrical connectors for providing electrical communication between the control system and the grow equipment to expand plant growing functionality when the pot module is detachably stacked atop the modular expansion platform.

In some examples, the control system includes a sensor system integrated into the pot body and in communication with the at least one processor for measuring one or more plant growth parameters, and the control system is operable to control operation of the grow equipment based on the plant growth parameters measured by the sensor system.

In some examples, the grow equipment comprises a fluid pump system for pumping fluid to the at least one cavity of the pot body, and the pot module interface includes one or more fluid connectors for providing fluid communication between the pot module and the fluid pump system when the pot module is detachably stacked atop the modular expansion platform.

In some examples, the pot module further comprises a sprinkler system integrated into the pot body and including one or more sprinkler nozzles positioned about a periphery of the at least one cavity for dispersion of fluid to the plant growing medium, and wherein the one or more fluid connectors include an outflow connector for providing fluid communication between the sprinkler system and the fluid pump system to conduct fluid pumped by the fluid pump system to the one or more sprinkler nozzles.

In some examples, the pot body includes an internal pot body fluid reservoir and an inlet for filling the pot body fluid reservoir, and the one or more fluid connectors include an inflow connector for providing fluid communication between the pot body fluid reservoir and the fluid pump system to supply fluid from the pot body fluid reservoir to the fluid pump system.

According to some aspects, a modular plant growing system comprises (a) a pot module including: (i) a pot body having a pot body base for supporting the pot body upright, a pot body top vertically opposite the pot body base, and at least one cavity open to the pot body top for receiving a plant growing medium, and (ii) a pot module interface on the pot body base and including one or more pot module fluid connectors for conducting fluid to the at least one cavity. The plant growing system further comprises (b) a modular expansion platform supporting the pot module and including: (i) a platform body having a platform base for supporting the platform body upright and a platform top vertically opposite the platform base, (ii) a platform interface on the platform top and including one or more platform fluid connectors, the platform interface interlockable with the pot module interface to detachably stack the pot module atop the modular expansion platform with the one or more pot module fluid connectors coupled to the one or more platform fluid connectors for fluid communication therebetween; and (iii) a fluid pump system in fluid communication with the one or more platform fluid connectors, the fluid pump system including a fluid pump and a fluid reservoir in fluid communication with the fluid pump for supplying fluid thereto to pump the fluid from the fluid reservoir to the at least one cavity of the pot body through the pot module and platform fluid connectors, the fluid pump provided in a detachable pump expansion module and at least a portion of the fluid reservoir provided in a detachable reservoir expansion module detachably stacked between the pump expansion module and the pot module.

DRAWINGS

For a better understanding of the described examples and to show more clearly how they may be carried into effect, reference will now be made, by way of example, to the accompanying drawings in which.

DESCRIPTION OF VARIOUS EXAMPLES

Figure 1:
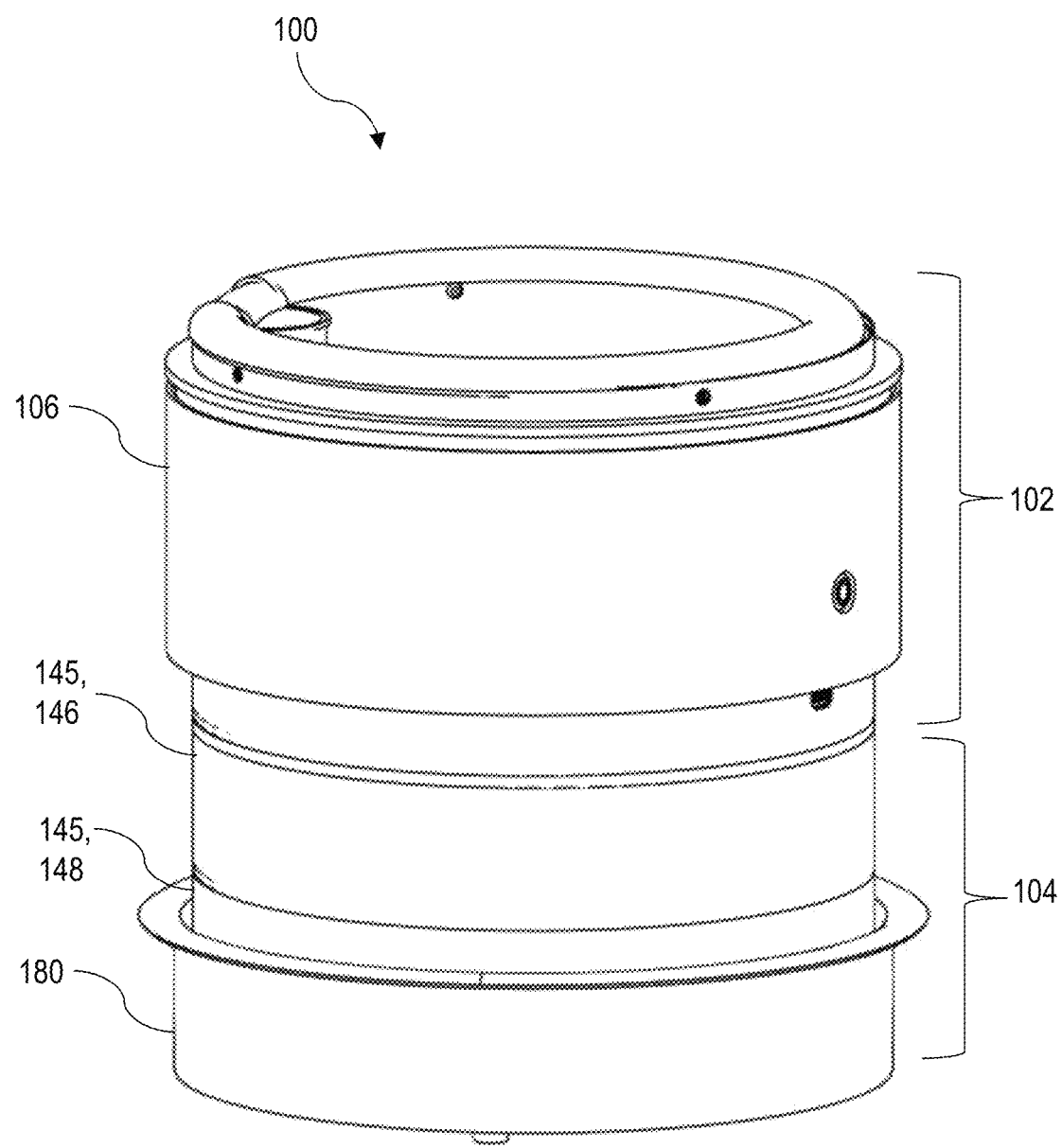
FIG. 1 is a perspective view of an example modular plant growing system.

Various apparatuses, systems, or processes will be described below to provide an example of each claimed invention. No example described below limits any claimed invention and any claimed invention may cover processes, systems, or apparatuses that differ from those described below. The claimed inventions are not limited to apparatuses, systems, or processes having all of the features of any one apparatus, system, or process described below or to features common to multiple or all of the apparatuses, systems, or processes described below. It is possible that an apparatus, system, or process described below is not an example of any claimed invention. Any invention disclosed in an apparatus, system, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Traditional plant pots are static in both design and functionality, offering limited adaptability to meet the diverse needs of different plants or user preferences. They typically lack more advanced technological features such as automated watering, nutrient delivery, adaptive lighting, and advanced wireless connectivity, which can facilitate optimal, automated plant care. The lack of such features in traditional plant pots limits the potential for remote management and real-time monitoring, a notable deficiency as gardening technology advances.

Some automated plant care systems can have integrated, fixed features, but lack customization and/or expansion capabilities. Such systems may not allow for any customization, or may be cumbersome to upgrade and present challenges in integrating newer technologies into the system, leading to an overall increase in costs and operational inefficiencies. Additionally, the general absence of intelligent interfaces severely limits user interaction, making it difficult to provide care that is tailored to real-time environmental conditions and specific plant needs.

There is a need for plant growing systems that can allow for customization and expansion of system functionality to accommodate changing user needs and technologies. According to some aspects of the present teachings, a modular plant growing system has a smart, modular architecture that can, in some examples, facilitate seamless addition of various interchangeable expansion modules. In some examples, the plant growing system can include a pot module and a modular expansion platform removably couplable to the pot module. The pot module includes a cavity for holding a plant growing medium in which a plant may be grown and a control system for controlling operation of the plant growing system.

The modular expansion platform can include one or more expansion modules for expanding functionality of the plant growing system. Existing expansion modules can be replaced/upgraded to improve or otherwise adjust plant growing functionality, and/or additional expansion modules can be added and conveniently integrated into the plant growing system to further add and/or improve functionality of the overall plant growing system. The expansion modules can include, for example, different types of grow equipment for facilitating plant cultivation. Example expansion modules can include, for example, automated watering systems, expanded water reservoirs, nutrient delivery systems, adaptive lighting systems, plant rotation systems, etc.

The expansion modules can be configured such that when coupled to the pot module and each other, the pot module is supported atop the expansion modules in a stacked arrangement. This can allow for expansion of system functionality without substantially affecting the overall footprint of the system. In this stacked arrangement, at least some of the modules can be in electrical communication with the control system (and each other, in some examples), such that the control system can receive signals from one or more of the expansion modules, transmit signals to one or more of the expansion modules, and/or receive and/or control supply of electrical power with respect to one or more of the expansion modules and grow equipment/components therein. In some examples, the pot module can initially be used independently with basic integrated functionality, and expansion modules can subsequently be added or changed to expand functionality for accommodating changing user or plant needs. In some examples, the control system can be provided in the "primary" pot module to provide basic functionality when the pot module is used on its own (e.g. connectivity to smart devices, integrated sensor systems, etc.). In other examples, the control system can be provided in an expansion module connectable to the pot module to expand control capabilities of the system. In some examples, the control system can have one or more local components integrated with the plant growing system (e.g. in the pot module and/or expansion modules), and one or more remote components provided as part of a remote device/system (e.g. mobile device, remote server, computer, etc.) and operable to communicate with the local components through wired or wireless communication for controlling operation of the plant growing system.

Figure 2:
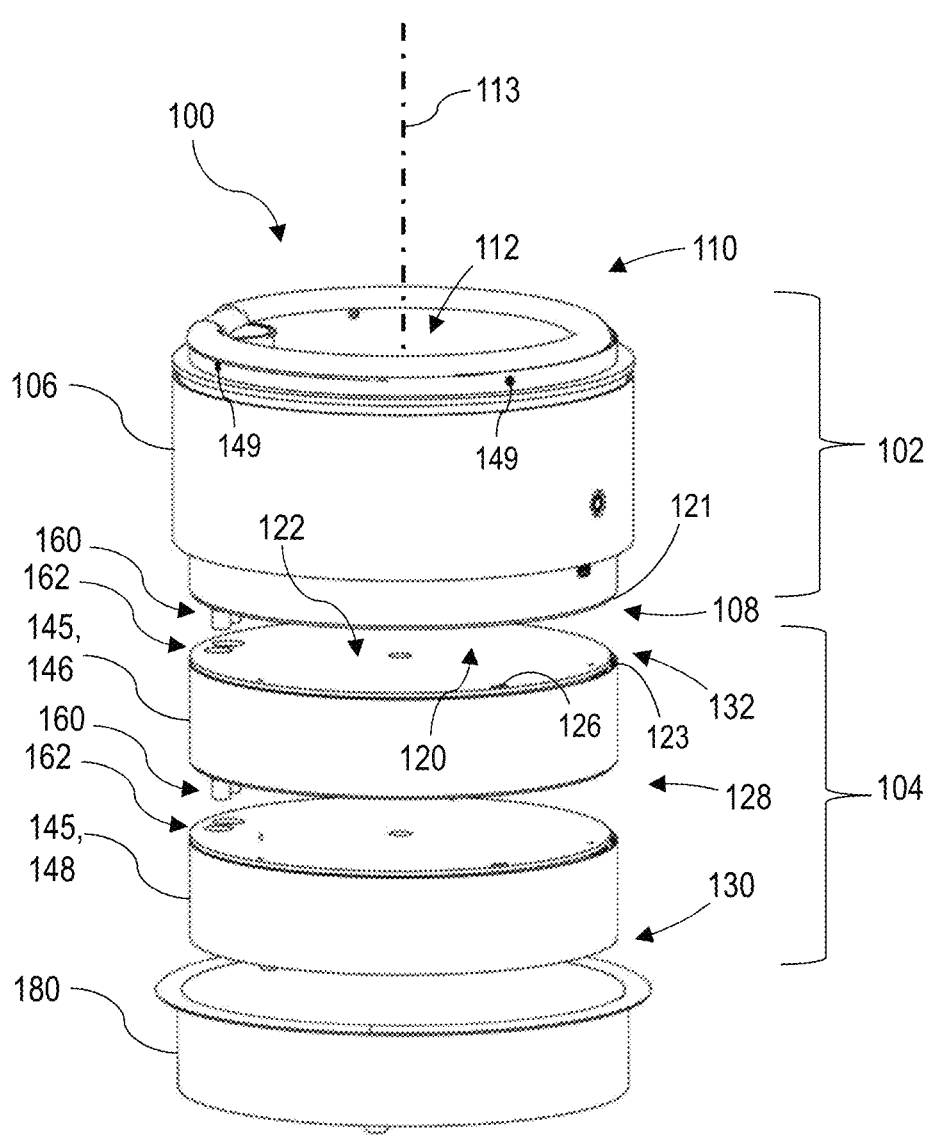
FIG. 2 is an exploded perspective view of the modular plant growing system of FIG. 1.

Referring to FIG. 1, an example modular plant growing system 100 is shown. The system 100 includes a pot module 102 and a modular expansion platform 104 detachably coupled to the pot module 102. Referring to FIG. 2, in the example illustrated, the pot module 102 includes a pot body 106 having a pot body base 108 for supporting the pot body 106 upright, a pot body top 110 vertically opposite the pot body base 108, and at least one cavity 112 open to the pot body top 110 for receiving a plant growing medium. The plant growing medium can comprise, for example, a soil-based plant growing medium. The pot module 102 extends vertically along a pot module axis 113 between the pot body base 108 and pot body top 110. In the example illustrated, the pot module 102 is generally cylindrical in shape, having a height along the pot module axis 113 and defined by a diameter perpendicular to the pot module axis 113. The pot module 102 can be shaped differently (e.g. conical, cubical, etc.) in other examples, while retaining the stacking capabilities.

Figure 3:
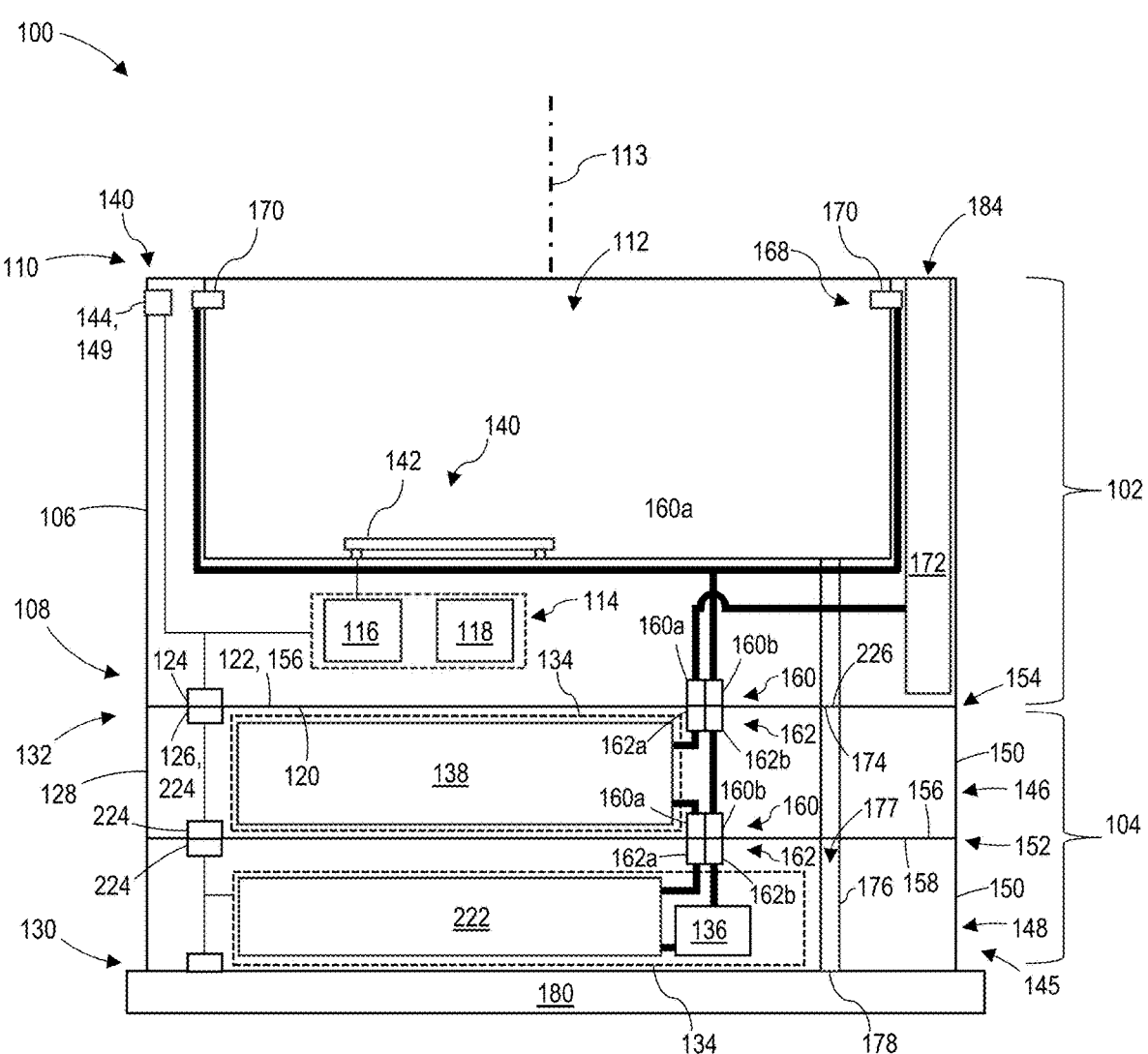
FIG. 3 is a schematic side elevation view of the plant growing system of FIG. 1.
Figure 5:
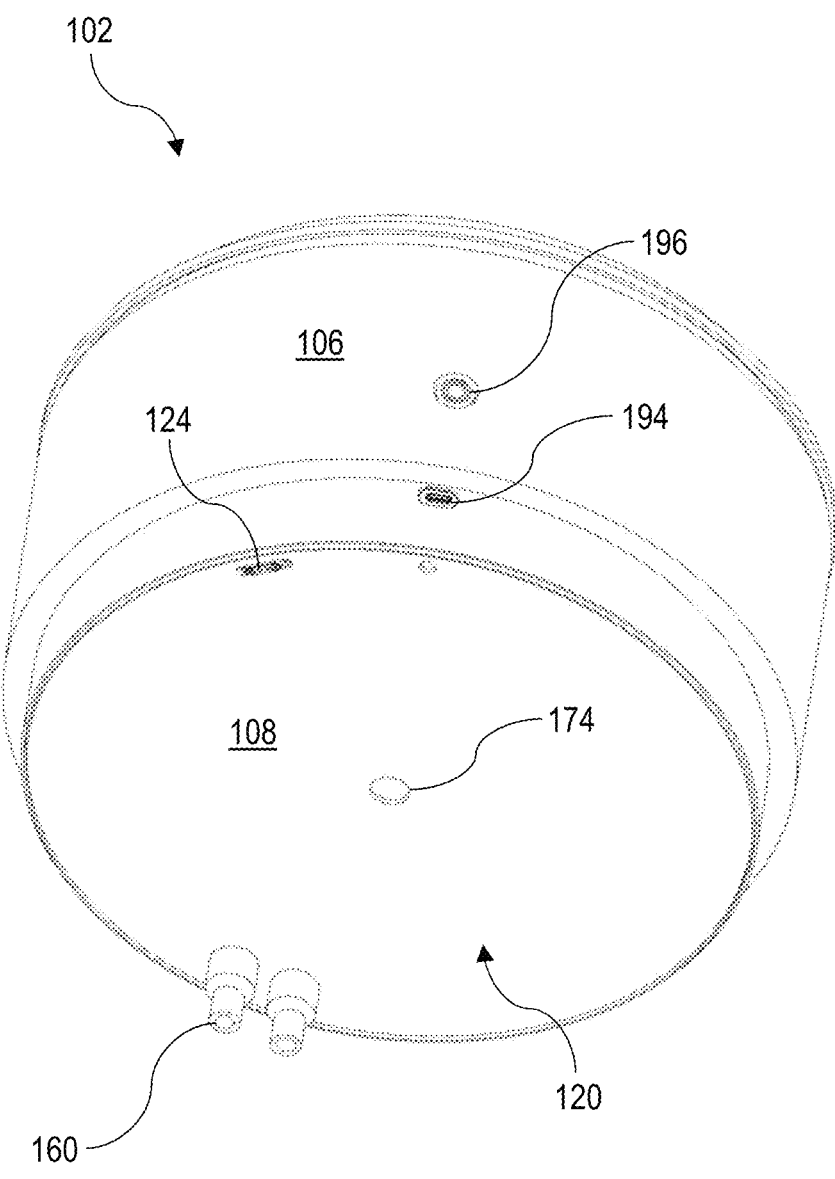
FIG. 5 is a bottom perspective view of a base portion of the pot module of FIG. 4.

Referring to FIG. 3, in the example illustrated, the plant growing system 100 further includes a control system 114 having at least one processor for controlling operation of the plant growing system 100. In the example illustrated, the control system 114 is integrated into the pot module 102, with the processor being within the pot body 106. A battery 118 can be provided in the pot body 106 for powering the control system 114 and/or other system components. In some examples, the pot module 102 can include a power input connector (e.g. USB-C port as described below) and power cord (e.g. USB-C cable) for providing electrical power to the plant growing system (e.g. to charge the battery 118 and/or provide power to system components with or without a battery). Referring to FIG. 2, in the example illustrated, the pot module 102 further includes a pot module interface 120 on the pot body base 108. Referring to FIG. 5, the pot module interface 120 includes at least one pot module electrical connector 124 in electrical communication with the control system 114 (FIG. 3).

Referring to FIG. 2, in the example illustrated, the modular expansion platform 104 includes a platform body 128 having a platform base 130 for supporting the platform body upright and a platform top 132 vertically opposite the platform base. The modular expansion platform 104 houses one or more types of grow equipment in the platform body 128 for facilitating growth of plants in the cavity of the pot module 102. In the example illustrated, the modular expansion platform 104 has a platform interface 122 on the platform top 132. The platform interface 122 includes at least one platform electrical connector 126 in electrical communication with at least some of the grow equipment in the modular expansion platform 104. The platform interface 122 is interlockable with the pot module interface 120 to detachably stack the pot module 102 atop the modular expansion platform with the pot module electrical connector 124 (FIGS. 3, 5) coupled to the platform electrical connector 126 to connect the grow equipment in the modular expansion platform 104 to the control system 114 in the pot module 102 for expanding plant growing functionality of the plant growing system 100. In the example illustrated, the expansion platform 104 is generally cylindrical in shape and coaxial with the pot module axis 113 to permit for stacking of the pot module thereon and to provide for an integrated aesthetic of the plant growing system when utilizing the expansion platform 104. The expansion platform 104 can be shaped differently (e.g. conical, cubical, etc.) in other examples, while retaining the stacking capabilities with the pot module 102 (e.g. by having corresponding, complementary shapes that permit stacking).

In the example illustrated, the pot module electrical connector 124 and the platform electrical connector 126 comprise pogo pins. Other types of electrical connectors can be used in other examples. In some examples, the electrical connectors for the pot module 102 and expansion platform 104 can be in the form of wireless connectors that can be brought in proximity to each other for wireless transmission of power and/or data signals (e.g. through induction and/or wireless communication protocols).

The pot body base 108 can have a support surface at an elevation below the electrical connectors 122 for supporting the pot module 102 in an upright configuration for use independent of the modular expansion platform 104. This can allow for the pot module 102 to be used independently of the expansion platform 104 for plant growth where, for example, expanded functionality is not initially required but may be desirable at a later time. The support surface in such examples may include and underside surface of the base 108 and/or integrated or detachable feet projecting downwardly from an underside of the pot module 102.

The platform interface 122 and the pot module interface 120 further provide for mechanical interconnection of the pot module 102 and modular expansion platform 104. Referring to FIG. 2, in the example illustrated, the platform interface 122 is mechanically interlockable with the pot module interface 120 to detachably stack the pot module 102 atop the modular expansion platform 104 with the one or more pot module electrical connectors 124 coupled to the one or more platform electrical connectors 126. In the example illustrated, the pot module interface 120 includes a pot module mating surface 121 for mechanically interlocking with a complementary platform mating surface 123 of the platform interface 122. In the present example, the mating surfaces comprise complementary peripheral edge portions (e.g. a lip on the pot body base 108 and complementary recess on the platform top 132) extending circumferentially about a radially outer periphery of the pot body base 108 and the platform top 132. The pot module interface 120 and platform interface 122 can further include other components (e.g. the fluid connectors disclosed further below) to facilitate locating, proper alignment, and interlocking of the pot module 102 with the expansion platform 104.

In the example illustrated, the modular expansion platform 104 includes a plurality of expansion modules 145 detachably stacked atop each other. Each expansion module 145 can include a different type of grow equipment. For example, in the example illustrated, the modular expansion platform 104 is shown to include a pair of expansion modules 145. The pair of expansion modules 145 in the present example include a fluid (e.g. water) reservoir expansion module 146 (having grow equipment in the form of an expanded fluid reservoir 138) and a fluid pump module 148 (having grow equipment in the form of a fluid pump system 134 for pumping fluid to the cavity 112).

Each expansion module 145 has a module body 150 extending vertically (along the pot module axis 113) between a module base 152 and a module top 154 vertically opposite the module base 152. In the example illustrated, each module body 150 comprises a housing for containing respective grow equipment. The housing is generally cylindrical in shape and coaxial with the pot module axis 113 to permit for generally seamless stacking of the modules one atop another to provide for an integrated aesthetic. In the example illustrated, the module body 150 of each expansion module is defined by a generally common diameter, which also generally corresponds to the diameter of the pot module interface 120 (and pot body 106) to permit stacking of the modules.

Referring to FIG. 3, each expansion module 145 has an upper module interface 156 on the module top 154 and a lower module interface 158 on the module base 152. The lower module interface 158 of an upper expansion module (e.g. module 146) is interlockable with the upper module interface 156 of a lower expansion module (e.g. module 148) for detachably stacking the expansion modules 146, 148 atop each other. In the example illustrated, each of the upper and lower module interfaces 156, 158 include respective expansion module electrical connectors 224 for providing electrical communication between the plurality of expansion modules 145. The upper module interface 156 of an uppermost expansion module (e.g. module 146 in the example illustrated) serves as the platform interface 122 for mechanically interlocking and providing electrical communication between the expansion platform 104 and the pot module 102.

In the example illustrated, each expansion module 146, 148 is in electrical communication with each other expansion module and the pot module 102 when detachably stacked. The system 100 is configured such that each expansion module 146, 148 includes interfaces 156, 158 allowing for electrical communication to each adjacent module and/or the pot module, such that electrical power and/or data signals may be passed among the expansion modules and the pot module 102. In some examples, some expansion modules can be configured to pass through power/data signals. In the example illustrated, the reservoir module 146 is configured to pass through power and/or data signals for providing electrical communication between the pot module above the reservoir module 146 and the fluid pump module 148 below the reservoir module 146. Other expansion modules—for example, those with electrical components—can receive and/or transmit electrical power and/or data signals. In the example illustrated, the fluid pump module 148 can receive power and control signals from the pot module 102 for operating the fluid pump system 134.

In other examples, the expansion platform 104 may comprise additional modules or a single module, or may be removed entirely, depending on the desired configuration for the system 100. Each expansion module is configured for selective addition to and removal from the modular expansion platform 104 independent of other expansion modules. For example, the system 100 illustrated may be reconfigured by removing the reservoir module 146, and connecting the fluid pump module 148 directly to the pot module 102 (with the upper interface of the fluid pump module 148 serving as the platform interface 122). Additional modules can also be added—for example, a rotation module can be added below the fluid pump module 148 and connected to the pot module 102/control system 114 through the electrical connectors of vertically intermediate expansion modules 145 for powering and/or controlling operation of the rotation module.

Each module 145 comprises grow equipment within the module body 150. The grow equipment in each module 145 can be a different type of grow equipment (e.g. a pump system, expanded fluid reservoir, plant rotation motor, etc.) and/or some modules can have the same type of grow equipment (e.g. by stacking multiple fluid reservoir expansion modules 146 atop each other to further increase watering capacity of the plant growing system 100). The grow equipment is connected to the platform interface 122, allowing for power and/or data/control signals to be passed between the control system 114 and the grow equipment.

In the example illustrated, each expansion module 145 is also in fluid communication with each other expansion module 146, 148 and the pot module 102 when the modules are detachably stacked. The pot module interface 120 and the lower interface 158 of each expansion module 156 includes one or more respective lower fluid connectors 160, and the platform interface 122/upper interface 156 of each expansion module 145 includes one or more complementary upper fluid connectors 162 for coupling with respective lower fluid connectors 160 when the modules are detachably stacked atop each other. The lower fluid connectors 160 can comprise, for example, male connectors, and the upper fluid connectors 162 can comprise female connectors for mating with the male connectors.

In the example illustrated, each interface includes a pair of fluid connectors, including a respective inflow connector 160a, 162a and a respective outflow connector 160b, 162b, allowing for fluid to flow bi-directionally between vertically adjacent modules 102, 146, 148. This can allow for inflow of fluid through the inflow connectors 160a, 162a from the pot module 102 downwardly to the fluid pump system 134, and for outflow of fluid through the outflow connectors 160b, 162b from the fluid pump system 134 back up to the pot module 102 for dispersion into the cavity 112 (e.g. to water plants growing in the cavity 112). In the present example, each of the fluid connectors comprises a one-way/directional valve, such that fluid flows in a desired direction through respective connectors. Each fluid connector can comprise a respective quick-connect/disconnect couplings, such that when the modules 146, 148 are stacked with each other and/or the pot module 102, the fluid connectors 160, 162 are coupled and configured for fluid flow, and when the modules 102, 146, 148 are disconnected/separated, fluid flow is blocked.

In the example illustrated, the fluid pump module 148 includes grow equipment in the form of the fluid pump system 134 for pumping fluid to the at least one cavity 112 of the pot body 106. The fluid pump system 134 includes a fluid pump 136 and a fluid pump reservoir 222 in fluid communication with the fluid pump 136 for supplying fluid thereto. The fluid pump 136 is in electrical communication with the control system 114 for controlling operation and supply of power to the fluid pump 136.

In the example illustrated, the reservoir module 146 includes grow equipment in the form of an expanded fluid reservoir 138 for expanding fluid capacity of the system 100. The expanded fluid reservoir 138 is in fluid communication with the fluid pump system 134 of the pump module 148 through the inflow connectors 160a, 162a, such that fluid can flow into the fluid pump reservoir 222 from which the fluid pump 136 draws fluid for pumping toward the cavity 112 (through outflow connectors 160b, 162b). In some examples, each fluid reservoir 172, 138, 222 can include respective water level sensors for monitoring water levels. The water level sensors are in communication with the control system 114 for determining, for example, water availability and an estimated number of days or watering cycles remaining before a refill is necessary, and/or to alert a user when the water levels reach a predefined refill threshold (e.g. through light indicators on the pot module or by sending alert notifications to a remote device). In some examples, water level sensors may be provided only in the fluid pump reservoir 222. In some examples, water level sensors may be provided only in the pot body fluid reservoir 172, or only in the expanded fluid reservoir 138.

In the example illustrated, the pot module 102 includes a sprinkler system 168 integrated into the pot body 106 and including one or more sprinkler nozzles 170 positioned about a periphery of the cavity 112 for dispersion of the fluid to the plant growing medium in the cavity 112. In the example illustrated, the outflow connectors 160b, 162b conduct fluid from the fluid pump system 134 to the sprinkler system 168 in the pot module 102. When the fluid pump system 134 is activated, fluid is pumped from the pump reservoir 222, through the outflow connectors 160b, 162b, and into the sprinkler system 168 of the pot module 102 for dispersion into the cavity 112 via the sprinkler nozzles 170.

In the example illustrated, the pot module 102 includes a pot body fluid reservoir 172 internal the pot body 106. The inflow connectors 160a, 162a supply fluid from the pot body fluid reservoir 172 to the expanded fluid reservoir 138 (if installed) and from the expanded fluid reservoir 138 to the pump reservoir 222 from which the pump 136 draws fluid for the sprinkler system 168. In the example illustrated, the pot body 106 has an inner wall 188 defining the cavity 112 and an outer wall 190 spaced outwardly from the inner wall 188 and defining an exterior of the pot body 106. The pot body fluid reservoir 172 is positioned between the inner and outer walls 188, 190.

Figure 4:
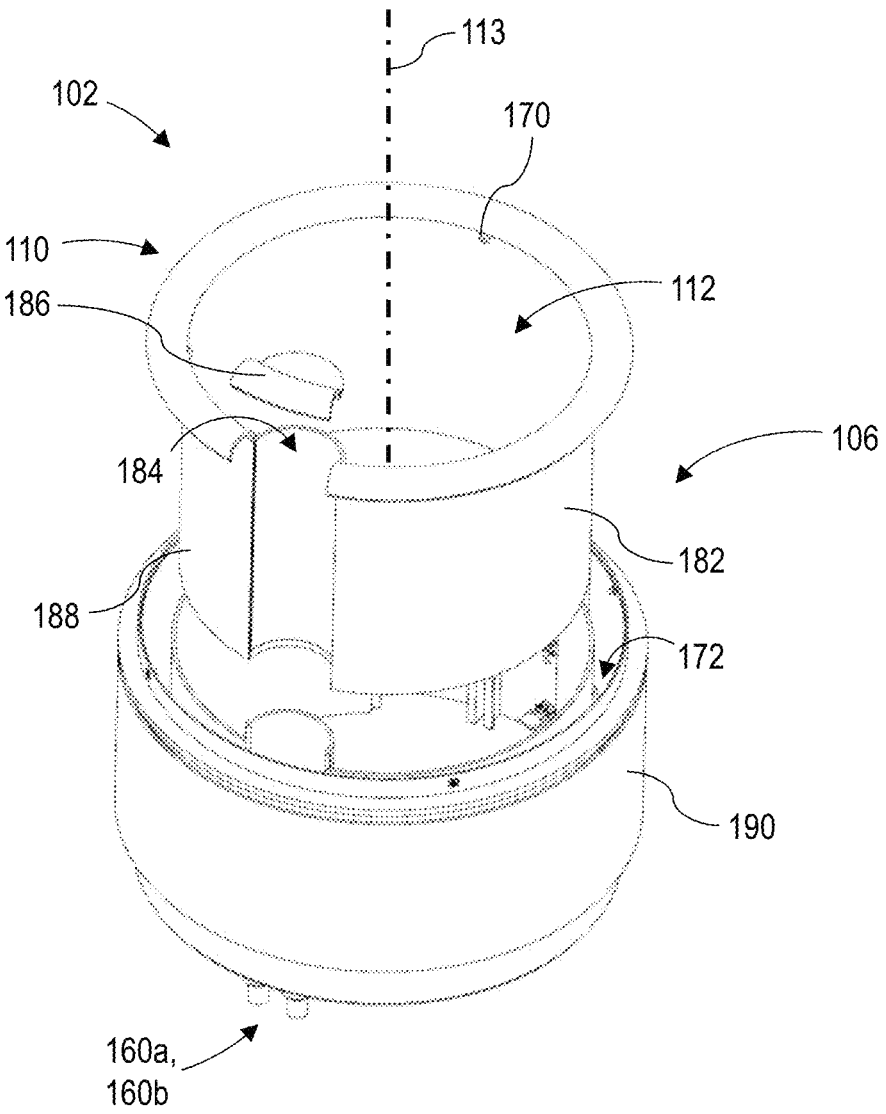
FIG. 4 is a partially exploded perspective view of a pot module of the plant growing system of FIG. 1.

Referring to FIG. 4, in the example illustrated, the inner wall 188 of the pot body 106 is in the form of a removable pot liner 182 defining a single cavity 112 therein. In the example illustrated, the inner and outer walls 188, 190 are generally cylindrical and extend circumferentially about the cavity 112 (and pot body axis 113). The pot body fluid reservoir 172 extends circumferentially about the cavity 112 (and pot body axis 113), radially intermediate the inner and outer walls 188, 190, and is in fluid communication with the inflow connector 160a of the pot module interface 120. In the example illustrated, the pot body 106 has a control system compartment between the inner and outer walls 188, 190 and in fluid isolation of the pot body fluid reservoir 172 (e.g. in a compartment separated from the fluid reservoir 172 through partition walls). The at least one processor 116 of the control system 114 is housed within the control system compartment.

In the example illustrated, the pot body 106 has an inlet 184 at the pot body top 110 (and adjacent the cavity opening) open to the pot body fluid reservoir 172 for supplying fluid (e.g. water) thereto. Fluid may be introduced into the inlet 184 to fill the reservoir 172 with fluid, which can then be conducted through the inflow connectors 160a, 162a to the expanded and pump reservoirs 138, 222 for supply to the pump 136 (FIG. 3). A detachable cover 186 can be provided for covering the inlet 184 when not in use (e.g. to prevent debris from entering the reservoir), and which can be removed to access the inlet 184 for filling the reservoir 172.

Referring to FIG. 3, in the example illustrated, the control system 114 further includes a sensor system 140 integrated into the pot body 106 and in communication with the at least one processor 116 of the control system 114 for measuring one or more plant growth parameters. The control system 114 is operable to control operation of the grow equipment based on the plant growth parameters measured by the sensor system 140.

The sensor system 140 can include at least one plant growing medium sensor 142 in the cavity 112 for measuring at least one plant growth parameter of the plant growing medium. In the example illustrated, the at least one plant growing medium sensor 142 comprises a moisture sensor for measuring moisture levels of the plant growing medium (e.g. soil moisture). The moisture sensor is positioned adjacent a bottom end of the cavity 112. If the control system 114 measures a low level of moisture within the plant growing medium with the moisture sensor, the control system 114 can alert the user and/or activate the fluid pump system 134 to provide water to the plant growing medium at preselected intervals and/or until a suitable moisture level is measured by the moisture sensor. In some examples, the plant growing medium sensor(s) can be selected to measure, for example, nutrient content, pH, temperature, aeration, contaminants, and/or any other plant growth parameters of the plant growing medium.

In some examples, the sensor system 140 can include at least one environmental sensor 144 exposed to an environment adjacent the cavity 112 for measuring at least one plant growth parameter of the environment. In the example illustrated, the environmental sensor 144 comprises one or more light sensors 149 for measuring ambient lighting and/or direction of lighting in the environment around the cavity. For example, the light sensors 149 can comprise photoresistors embedded within the outer wall of the pot body 106, generally flush with the exterior surface to unobtrusively measure ambient light (e.g. see sensor 144 in FIG. 2). A plurality of the light sensors 149 can be spaced circumferentially about the pot body 106 to provide for comprehensive light exposure data from all directions, which can help contribute to optimal plant care adjustments based on environmental lighting conditions. In some examples, the environmental sensor(s) can be selected to measure, for example, ambient temperature, humidity, air circulation, $CO_2$ levels, and/or any other plant growth parameter of the environment within which the plant growing system 100 is in use.

Figure 6A:
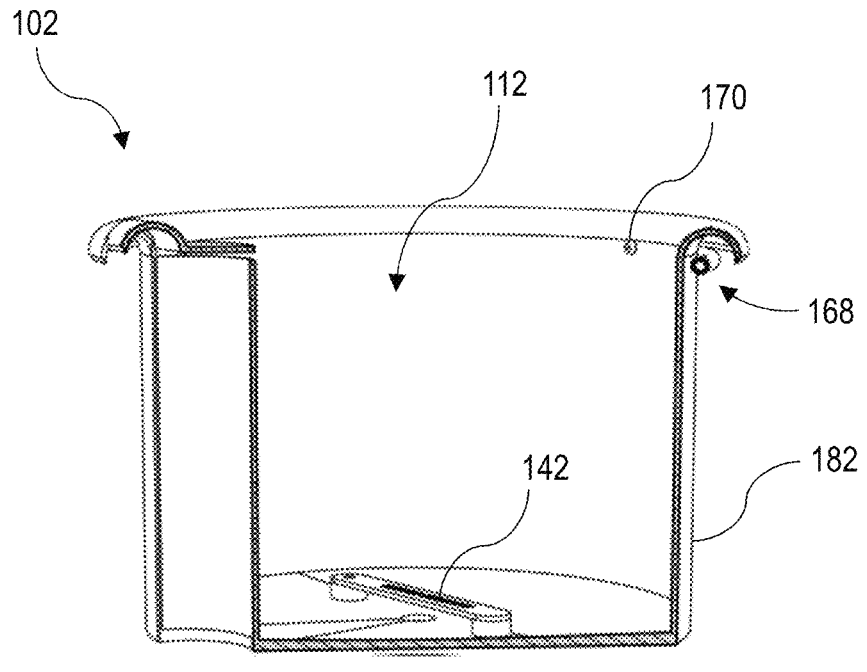
FIG. 6A is a cutaway perspective view of an inner portion of the pot module of FIG. 4.
Figure 6B:
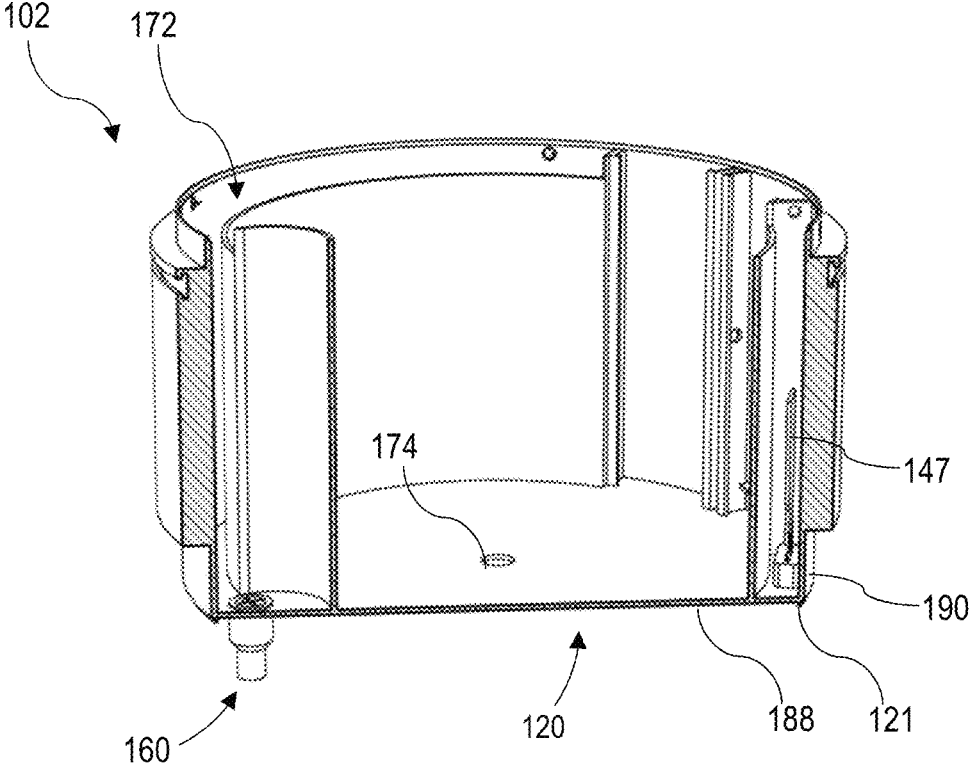
FIG. 6B is a cutaway perspective view of a base portion of the pot module of FIG. 4.

Referring to FIG. 6B, the sensor system 140 can include additional sensors, such as, for example, water level sensors 147 for measuring water levels in the fluid reservoir 172 (as described above).

In the example illustrated, when the pot module 102 is in electrical communication with the expansion platform 104, the control system 114 is operable to control operation of the grow equipment to facilitate plant growth. The control system 114 can be configured to receive control parameters for the grow equipment and control operation of the grow equipment based on the control parameters and the plant growth parameters. The control system 114 can include computer-readable memory 198 (FIG. 11) for storing the control parameters and the plant growth parameters, and the processor 116 can receive the control parameters from the computer-readable memory 198. In some examples, the control parameters and/or plant growth parameters may be received wirelessly from a remote device (e.g. mobile phone, remote server, etc.) using a wireless communication system 200 (see FIG. 11) of the control system 114.

In some examples, the control system 114 is configured to control operation of the grow equipment by controlling supply of electrical power to the grow equipment when in electrical communication with the grow equipment through the one or more electrical connectors 124, 126. For example, the control system 114 may control supply of power to the fluid pump system 134 to activate the pump 136 for providing water to the plant growing medium.

In some examples, the control system 114 is configured to detect connection of the grow equipment when the pot module 102 is detachably stacked atop the modular expansion platform 104. For example, each expansion module 146, 148 can include a respective identifier (e.g. RFID tag, memory chip, etc.) for the type of grow equipment in the expansion module, and the control system 114 can be configured to detect connection of each type of grow equipment via respective identifiers and receive and/or transmit the control parameters for that grow equipment. In some examples, the control system 114 can detect connection of an expansion module, and retrieve information for identifying the module and/or prompt a user to specify the type of module/grow equipment being connected (e.g. through a notification/request sent to a mobile device). In some examples, each module includes a memory chip storing unique pre-programmed identifiers for each type of expansion module/grow equipment. These identifiers can facilitate system integrity, and can be checked against a database (e.g. stored in system memory or in the cloud/remote servers) when an expansion module is connected. This verification process can allow the control system 114 in the pot module 102 to authenticate each module, which in some examples can help ensure that only compatible and authorized components are integrated into the system 100. Such a safeguard can help prevent use of incompatible or unauthorized modules, which can help enhance system reliability.

Figure 7:
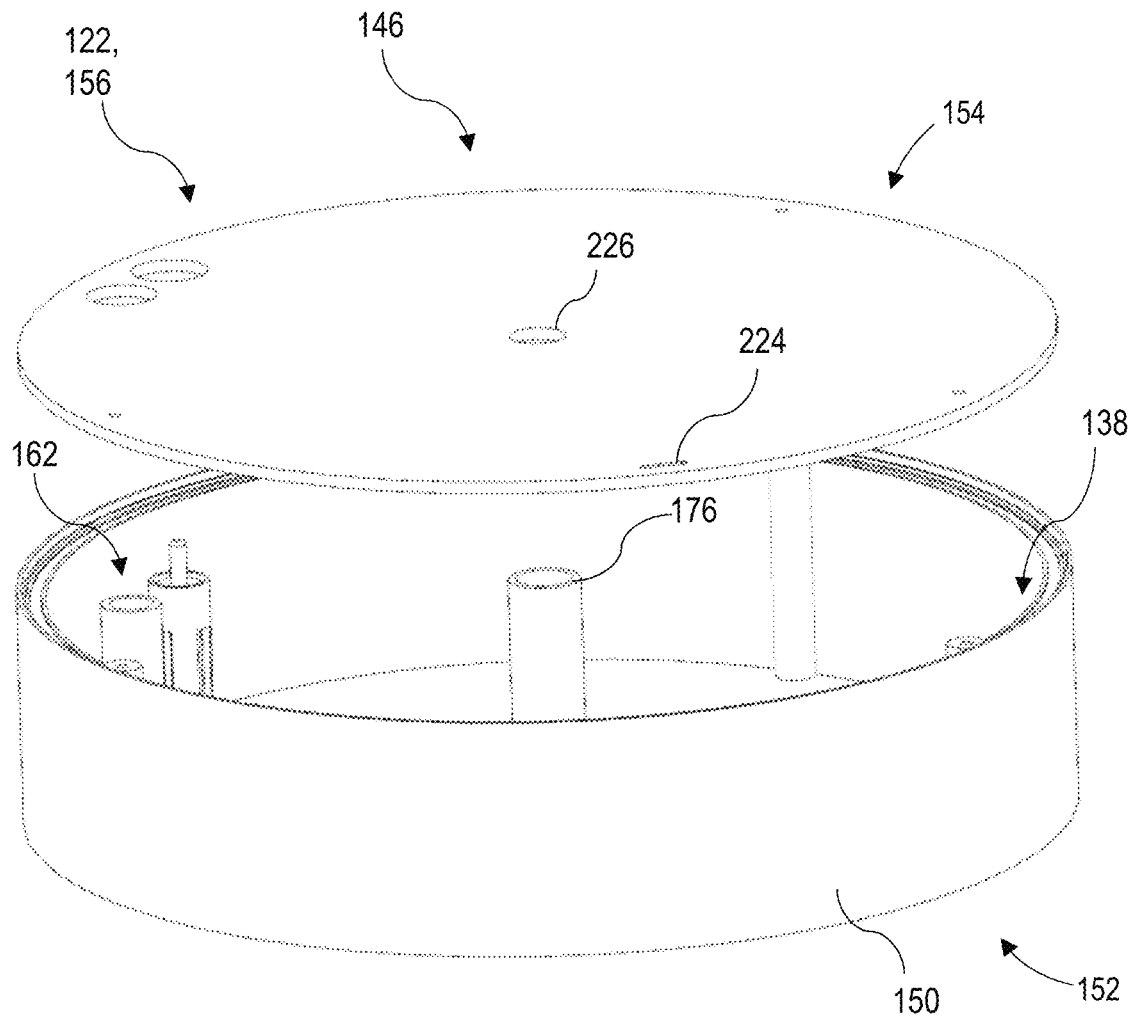
FIG. 7 is a partially exploded top perspective view of a reservoir module of the plant growing system of FIG. 1.
Figure 8:
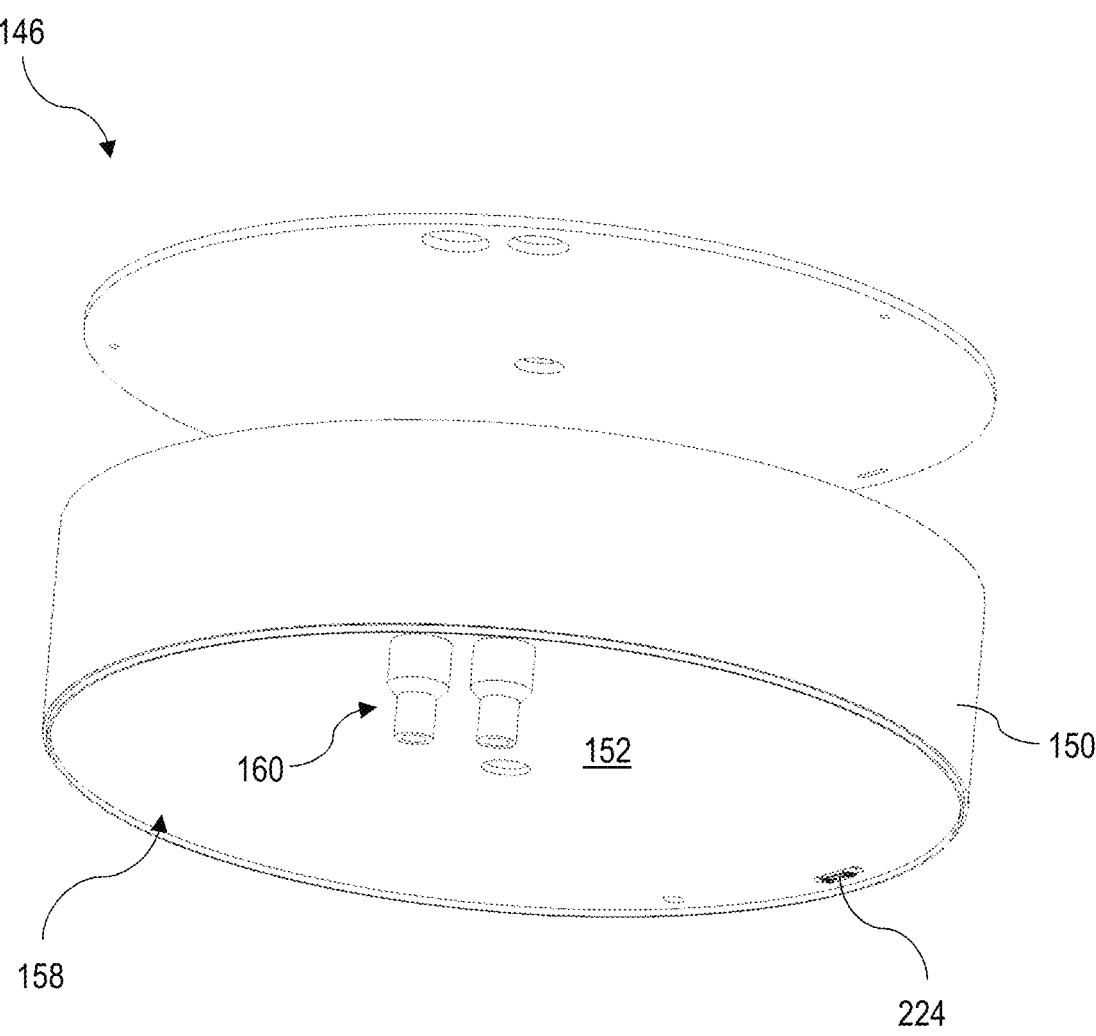
FIG. 8 is a partially exploded bottom perspective view of the reservoir module of FIG. 7.
Figure 9:
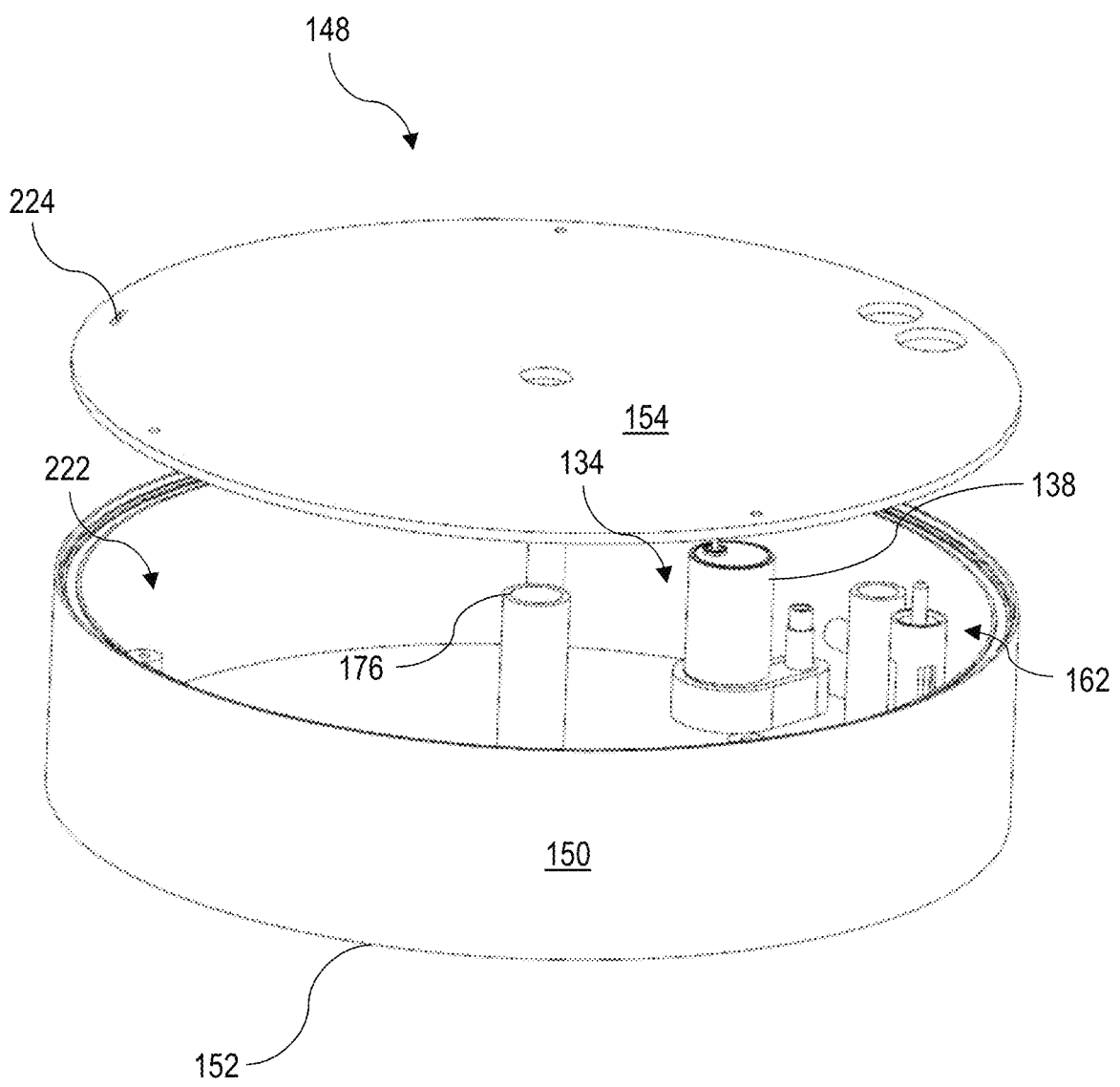
FIG. 9 is a partially exploded top perspective view of a pump module of the plant growing system of FIG. 1.
Figure 10:
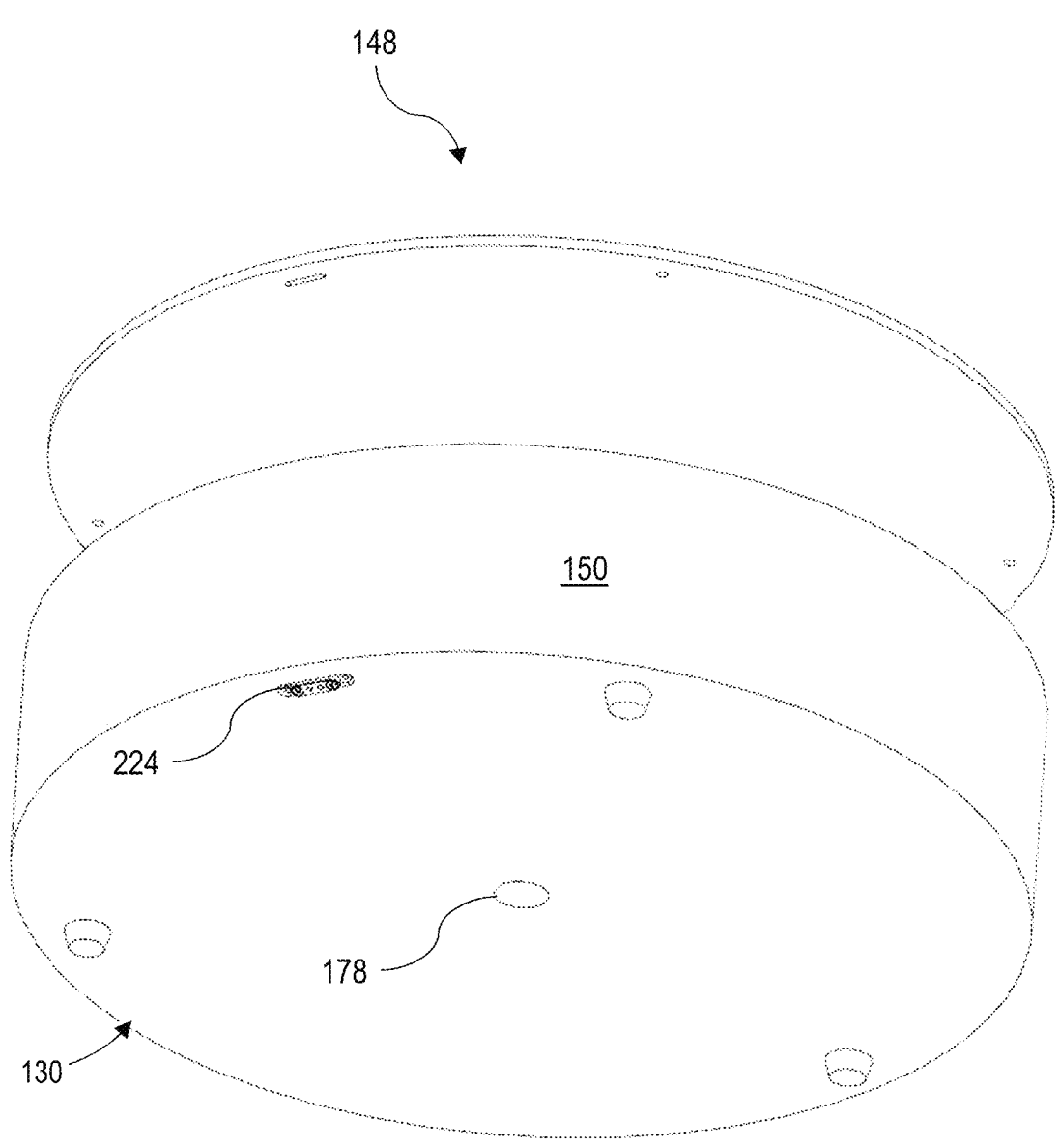
FIG. 10 is a partially exploded bottom perspective view of the pump module of FIG. 9.

Referring to FIGS. 6A and 6B, in the example illustrated, the pot module interface 120 has at least one pot body drainage port 174 in fluid communication with a bottom of the cavity 112 for drainage of fluid, solids, and/or a mixture therefrom. Referring to FIG. 7, in the example illustrated, the platform interface 122 has at least one platform drainage port 226. When the pot module 102 is stacked atop the expansion platform 104, the pot body drainage port 174 is in alignment and fluid communication with the platform drainage port 226 for providing fluid communication between cavity 112 and a platform fluid passage 177 (FIG. 3) extending vertically through the platform body 128 to one or more drainage outlets 178 (FIG. 10) in the platform base 130.

Referring to FIG. 2, in the example illustrated, the plant growing system 100 includes a drainage module 180 (in the form of a dish, in the example illustrated) in which the base 130 of the platform body 128 is received. The drainage outlet 178 (FIG. 10) is open to the drainage module 180 for collecting fluid/debris drained from the cavity 112 through the passage 177 (FIG. 3). Referring to FIG. 3, in the example illustrated, each expansion module 145 has a module fluid passage 176 extending vertically through the expansion module 146, 148 between the module top 154 and the module base 152, and the module fluid passage 176 of the plurality of expansion modules are in alignment when the expansion modules 145 are stacked atop each other to form the expansion platform fluid passage 177.

Referring to FIG. 5, in the example illustrated, the control system 114 includes a power and/or communications port 194 (e.g. USB-C port) on the pot body 106 for power supply and/or data transfer. The port 194 can allow for wired communication with the control system 114, as well as power supply to the pot module 102 (and the grow equipment when coupled to the control system 114). In some examples, the battery 118 of the pot module 102 may be charged through the port 194.

The pot module 102 further comprises a power/control switch 196 for powering and/or adjusting operability of the system 100. The pot module 102 can further includes status indicators, for example, RGB LEDs, configured to illuminate in various colors and/or patterns based on the status of the system 100.

Figure 11:
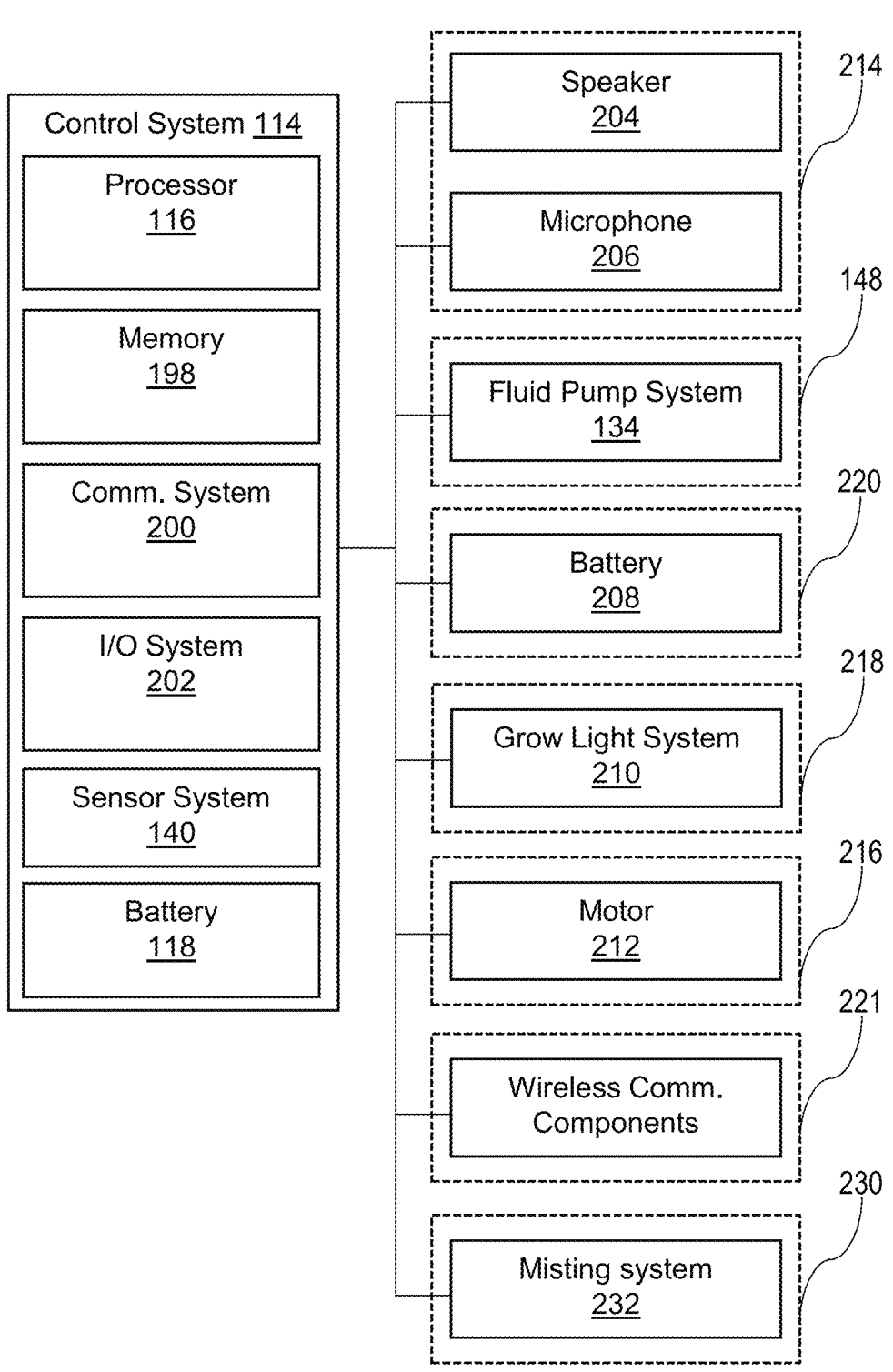
FIG. 11 is a block diagram of a control system for the plant growing system of FIG. 1.

Referring now to FIG. 11, in the example illustrated, the control system 114 is shown to include the processor 116, memory 198, communications system 200 (e.g. wireless communication system), I/O system 202, sensor system 140, and battery 118.

The processor 116 can comprise, for example, a general-purpose processor configured to execute machine-readable instructions stored on memory 198. In other examples, processor 116 may receive machine instructions from the communications system 200 or from an external device through the I/O interface 202. The memory 198 can comprise, for example, non-transient computer readable memory, and can be configured to store system data and/or machine-readable instructions for execution by processor 116. Memory 198 may store system control parameters, plant growth parameters, and/or a database of identifiers for identifying modules when connected to the control system 114. The communications system 200 can comprise wireless communication components configured to enable the control system 114 to communicate over a local or wide area network. The communications system 200 may comprise WiFi (e.g. WiFi 6), Bluetooth, Zigbee, NFC, and/or any other suitable communications components. The I/O system 202 can comprise system components for interfacing with external components, such as power equipment, control equipment, diagnostic devices, external devices, etc.

In some examples, the plurality of expansion modules can include a nutrient delivery module. The nutrient delivery module can comprise a nutrient delivery system for delivering nutrients to the plant growing medium. In some examples, the nutrient delivery module can be combined with a fluid reservoir module, and may include a nutrient delivery system for injecting nutrients into the fluid reservoir for supply to the plant growing medium through the pump and sprinkler systems.

In some examples, the plurality of expansion modules can include a grow light module 218 including a grow light system 210 for providing lighting to plants growing in the plant growing medium. In such examples, the grow light module 218 can include a grow light controller coupled to the control system 114 for controlling one or more grow lights positioned over the cavity for providing light to facilitate plant growth.

In some examples, the plurality of expansion modules can include a rotation module 216 comprising a motor 212 for driving rotation of the pot body 106 about the axis 113. The top of the rotation module 216 can comprise a rotary table atop which other expansion modules 145 and the pot module 102 are supported, and which is rotatable by the motor 212 relative to the base of the rotation module for driving rotation of the pot module (and any other expansion modules between the rotation module 216 and the pot module 102). This can allow for rotation of the pot module 102 (and plant) relative to a light source to help provide more even light exposure about the plant (e.g. by rotating the pot module 102 relative to grow lights and/or a source of natural light such as sunlight through a window near the system 100). The rotation module 216 can serve as the bottommost module of the expansion platform 104, with the base of the rotation module 216 serving as the platform base. The rotation motor 212 can be in electrical communication with the control system 114 when the pot module 102 is stacked atop the expansion platform 104 having the rotation module 216, allowing for power and control signals to be passed from the control system 114 to the rotation motor 212.

In some examples, the plurality of expansion modules can include a battery expansion module 220 including a battery pack 208 for storing electrical energy for powering the plant growing system 100 (e.g. the pot module 102 and/or grow equipment in other expansion modules via the electrical connectors). In such examples, the battery 118 in the pot module 102 can be omitted, and/or the battery pack 208 can be added in addition to the battery 118 to increase battery capacity of the system 100.

In some examples, the plurality of expansion modules can include a wireless communication expansion module 221 including wireless communication components for enabling and/or enhancing wireless communication between the plant growing system 100 and other devices/systems. In such examples, the communications system 200 may be omitted, and/or the wireless communication expansion module 221 may provide for enhanced wireless communication (e.g. for enabling the latest wireless communication protocols).

In some examples, the plurality of expansion modules can include a smart speaker expansion module 214 having a microphone 206 for receiving verbal input to control operation of the plant growing system 100 (via control system 114) and a speaker 204 for providing verbal output of information relating to the plant growing system 100.

In some examples, the plurality of expansion modules can include an animal deterrent module for deterring animals (e.g. pets such as cats or dogs, or wildlife) from damaging the system, plant, or growth medium. The animal deterrent module can include, for example, one or more fluid sprays, ultrasonic speakers, motion or pet detection sensors, an internal water channel with a water level sensor, and/or other components to facilitate deterrence of animals from approaching and/or interacting with the plant growing system.

In some examples, the functionality/equipment described herein for separate expansion modules may be combined into one expansion module. For example, the nutrient delivery system can be combined with the fluid reservoir expansion module, and/or the smart speaker and microphone systems can be integrated with the wireless communication expansion module.

Figure 12:
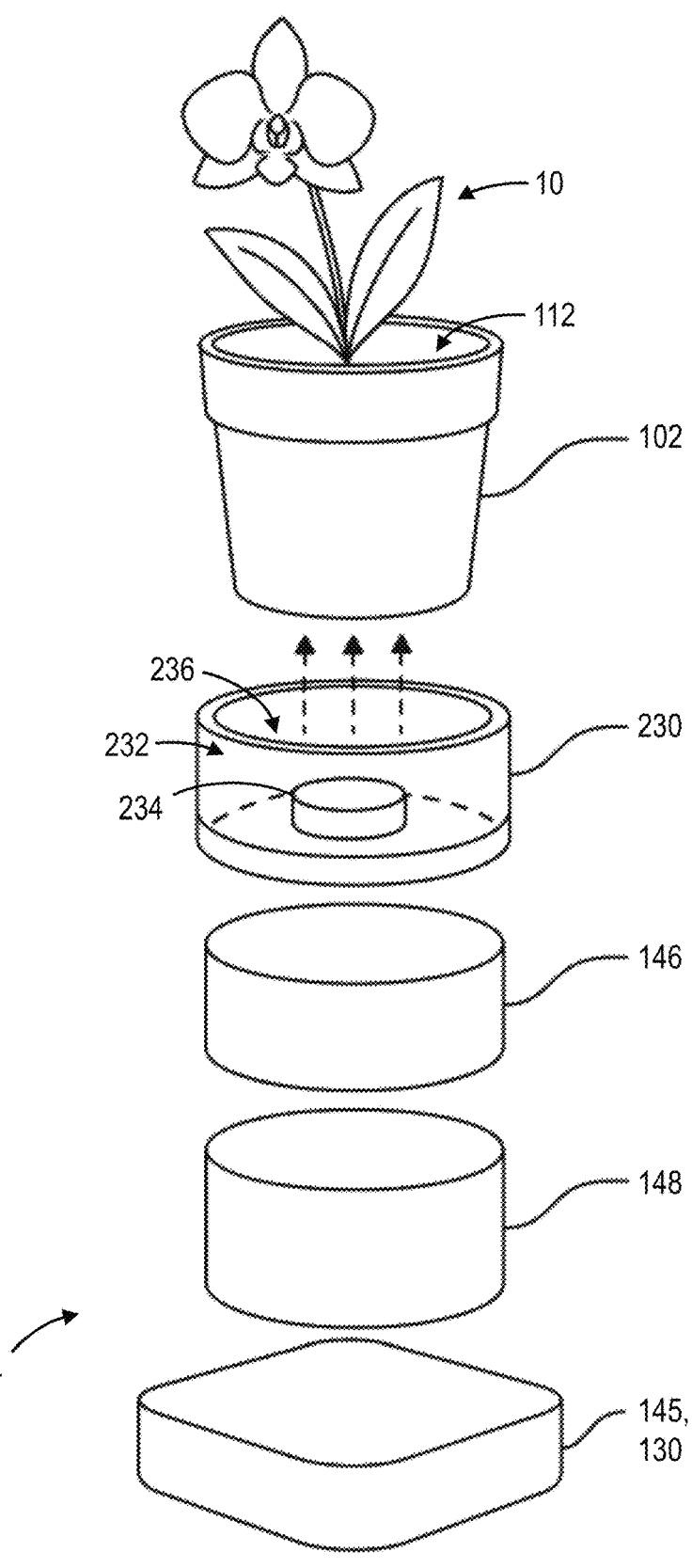
FIG. 12 is a schematic showing another example configuration of the modular plant growing system.

Referring to FIG. 12, in the example illustrated, the expansion modules comprise a misting module 230 detachably stackable with the pot module 102 and/or other expansion modules (e.g. the expansion reservoir and pump modules 146, 148). The misting module 230 can comprise grow equipment in the form of an ultrasonic misting system 232 for delivering water-based aerosol (e.g. water vapor and/or aerosolized nutrients) to the plant growing medium or directed to one or more plants 10 in the cavity (e.g. directly to plant roots and/or leaves). In the example illustrated, the ultrasonic misting system 232 can include an ultrasonic transducer 234 (e.g. piezoelectric mist generator) integrated into the misting module 230. The misting module 230 is electrically connectable to the control system 114 via electrical connectors similar to those described previously, and can receive power and control signals from the control system 114 for controlling operation of the ultrasonic transducer 234 (and/or other components of the misting module 230).

The misting module 230 is operable by the control system 114 to generate a fine water mist, which is directed upwards toward the plant growing medium, root system, and/or aerial portions of the plant 10. In some embodiments, the misting module 230 may include one or more directional nozzles or diffusers to optimize mist delivery. The control system 114 may activate the misting module 230 in response to measured plant growth parameters, such as humidity, substrate moisture, or based on pre-set user preferences.

The misting module 230 may be used alone or in combination with other expansion modules (e.g. such as the fluid pump module 148, reservoir expansion module 146, nutrient delivery module, etc.) to deliver a combination of water, nutrients, or growth stimulants in aerosolized form. In some examples, the misting module 230 can include fluid connectors (like those described above) for providing fluid communication with the expanded reservoir, pump, and/or nutrient delivery modules for receiving water (and optionally nutrients) for aerosolization. In some examples, the misting module 230 can include a misting reservoir 236 for storing water/nutrients received from other modules for misting, and/or to allow a user to refill the misting reservoir 236 directly with water for aerosolizing (e.g. without necessarily requiring or relying on the expanded reservoir and/or pump modules 146, 148 for water supply). The misting module 230 may also include integrated sensors for measuring mist output, humidity, or other parameters to help optimize the misting operation.

When the misting module 230 is electrically connected to the pot module 102 (e.g. as part of the expansion platform 104), the control system 114 detects connection of the misting module 230 and can adjust watering routines accordingly, providing plants with targeted hydration via mist as an alternative or supplement to conventional irrigation methods (e.g. through the sprinkler system 168). This can be beneficial for certain plant types (such as orchids) that thrive with gentle, gradual moisture delivery to their root zone.

The invention claimed is:

1. A modular plant growing system, comprising:
   a) a pot module including:
      i) a pot body having a pot body base for supporting the pot body upright, a pot body top vertically opposite the pot body base, and at least one cavity open to the pot body top for receiving a plant growing medium,
      ii) a control system including at least one processor in the pot body for controlling operation of the plant growing system, and
      iii) a pot module interface on the pot body base and including one or more pot module electrical connectors in electrical communication with the control system; and
   b) a modular expansion platform including:
      i) a platform body having a platform base for supporting the platform body upright and a platform top vertically opposite the platform base,
      ii) grow equipment in the platform body, and
      iii) a platform interface on the platform top and including one or more platform electrical connectors in electrical communication with the grow equipment, the platform interface interlockable with the pot module interface to detachably stack the pot module atop the modular expansion platform with the one or more pot module electrical connectors coupled to the one or more platform electrical connectors to connect the grow equipment to the control system for expanding plant growing functionality of the plant growing system.

2. The plant growing system of claim 1, wherein the control system includes a sensor system integrated into the pot body and in communication with the at least one processor for measuring one or more plant growth parameters, and the control system is operable to control operation of the grow equipment based on the plant growth parameters measured by the sensor system.

3. The plant growing system of claim 1, wherein the modular expansion platform includes a plurality of expansion modules detachably stacked atop each other, at least two of the expansion modules having a different type of grow equipment relative to each other.

4. The plant growing system of claim 3, wherein each expansion module is configured for selective addition to and removal from the modular expansion platform independent of other expansion modules.

5. The plant growing system of claim 3, wherein at least two of the expansion modules are in electrical communication with each other and the pot module when detachably stacked.

6. The plant growing system of claim 3, wherein at least two of the expansion modules are in fluid communication with each other and the pot module when detachably stacked.

7. The plant growing system of claim 1, wherein the grow equipment comprises a fluid pump system operable by the control system for pumping fluid to the at least one cavity of the pot body, and the pot module interface and the platform interface have respective fluid connectors coupled to each other for providing fluid communication between the pot module and the fluid pump system when the pot module is detachably stacked atop the modular expansion platform.

8. The plant growing system of claim 7, wherein the fluid pump system includes a fluid pump and a fluid reservoir in fluid communication with the fluid pump for supplying fluid thereto.

9. The plant growing system of claim 7, further comprising a sprinkler system integrated into the pot body and including one or more sprinkler nozzles positioned about a periphery of the at least one cavity for dispersion of fluid to the plant growing medium, and wherein the fluid connectors include respective outflow connectors for conducting fluid from the fluid pump system to the sprinkler system.

10. The plant growing system of claim 7, wherein the pot module includes a pot body fluid reservoir internal the pot body, and wherein the fluid connectors include respective inflow connectors for supplying fluid from the pot body fluid reservoir to the fluid pump system.

11. The plant growing system of claim 10, wherein the pot body has an inner wall defining the at least one cavity and an outer wall spaced outwardly from the inner wall and defining an exterior of the pot body, and wherein the pot body fluid reservoir is between the inner and outer walls.

12. The plant growing system of claim 1, wherein the pot module interface has one or more pot body drainage ports in fluid communication with the at least one cavity for drainage therefrom, and the platform interface has one or more platform drainage ports for providing fluid communication between the one or more pot body drainage ports and an expansion platform fluid passage extending vertically through the platform body to one or more drainage outlets in the platform base.

13. The plant growing system of claim 1, wherein the grow equipment comprises a nutrient delivery system operable by the control system for delivering nutrients to the plant growing medium.

14. The plant growing system of claim 1, wherein the grow equipment comprises a grow light system operable by the control system for providing lighting to plants growing in the plant growing medium.

15. The plant growing system of claim 1, wherein the grow equipment comprises a rotation motor operable by the control system for driving rotation of the pot body about a vertical axis relative to a light source.

16. The plant growing system of claim 1, wherein the grow equipment comprises a battery pack for storing electrical energy for powering the plant growing system.

17. The plant growing system of claim 1, wherein the grow equipment comprises a wireless communication system for enabling wireless communication with the plant growing system.

18. The plant growing system of claim 1, wherein the grow equipment comprises a smart speaker system including a microphone for receiving verbal input to control operation of the plant growing system and a speaker for providing verbal output of information relating to the plant growing system.

19. The plant growing system of claim 1, wherein the grow equipment comprises an ultrasonic misting system including an ultrasonic transducer operable by the control system to generate water-based aerosol for delivery to one or more of the plant growing medium and at least one plant in the cavity.

20. A pot module for a modular plant growing system, comprising:
a) a pot body having a base, a top vertically opposite the base, and at least one cavity open to the top for receiving a plant growing medium;

b) a control system including at least one processor in the pot body for controlling operation of the plant growing system; and
c) a pot module interface on the base for detachably stacking the pot module atop a modular expansion platform comprising grow equipment, the pot module interface including one or more pot module electrical connectors for providing electrical communication between the control system and the grow equipment to expand plant growing functionality when the pot module is detachably stacked atop the modular expansion platform.

21. The pot module of claim 20, wherein the control system includes a sensor system integrated into the pot body and in communication with the at least one processor for measuring one or more plant growth parameters, and the control system is operable to control operation of the grow equipment based on the plant growth parameters measured by the sensor system.

22. The pot module of claim 20, wherein the grow equipment comprises a fluid pump system for pumping fluid to the at least one cavity of the pot body, and the pot module interface includes one or more fluid connectors for providing fluid communication between the pot module and the fluid pump system when the pot module is detachably stacked atop the modular expansion platform.

23. The pot module of claim 22, further comprising a sprinkler system integrated into the pot body and including one or more sprinkler nozzles positioned about a periphery of the at least one cavity for dispersion of fluid to the plant growing medium, and wherein the one or more fluid connectors include an outflow connector for providing fluid communication between the sprinkler system and the fluid pump system to conduct fluid pumped by the fluid pump system to the one or more sprinkler nozzles.

24. The pot module of claim 22, wherein the pot body includes an internal pot body fluid reservoir and an inlet for filling the pot body fluid reservoir, and the one or more fluid connectors include an inflow connector for providing fluid communication between the pot body fluid reservoir and the fluid pump system to supply fluid from the pot body fluid reservoir to the fluid pump system.

25. A modular plant growing system, comprising:
a) a pot module including: (i) a pot body having a pot body base for supporting the pot body upright, a pot body top vertically opposite the pot body base, and at least one cavity open to the pot body top for receiving a plant growing medium, and (ii) a pot module interface on the pot body base and including one or more pot module fluid connectors for conducting fluid to the at least one cavity; and
b) a modular expansion platform supporting the pot module and including:
(i) a platform body having a platform base for supporting the platform body upright and a platform top vertically opposite the platform base,
(ii) a platform interface on the platform top and including one or more platform fluid connectors, the platform interface interlockable with the pot module interface to detachably stack the pot module atop the modular expansion platform with the one or more pot module fluid connectors coupled to the one or more platform fluid connectors for fluid communication therebetween; and
(iii) a fluid pump system in fluid communication with the one or more platform fluid connectors, the fluid pump system including a fluid pump and a fluid reservoir in fluid communication with the fluid pump for supplying fluid thereto to pump the fluid from the fluid reservoir to the at least one cavity of the pot body through the pot module and platform fluid connectors, the fluid pump provided in a detachable pump expansion module and at least a portion of the fluid reservoir provided in a detachable reservoir expansion module detachably stacked between the pump expansion module and the pot module.

* * * * *